(12) United States Patent
Jung (10) Patent No.: US 12,192,232 B2
(45) Date of Patent: Jan. 7, 2025

(54) SECURITY SYSTEM FOR IN-VEHICLE NETWORK AND METHOD THEREFOR

(71) Applicants: Hyundai Motor Company, Seoul (KR); Kia Corporation, Seoul (KR)

(72) Inventor: Ho Jin Jung, Bucheon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 657 days.

(21) Appl. No.: 17/366,402

(22) Filed: Jul. 2, 2021

(65) Prior Publication Data

US 2022/0182408 A1   Jun. 9, 2022

(30) Foreign Application Priority Data

Dec. 8, 2020   (KR) .......................... 10-2020-0170854

(51) Int. Cl.
*H04L 29/06* (2006.01)
*H04L 9/40* (2022.01)
*H04L 12/40* (2006.01)

(52) U.S. Cl.
CPC .......... *H04L 63/1466* (2013.01); *H04L 12/40* (2013.01); *H04L 63/1416* (2013.01); *H04L 63/20* (2013.01); *H04L 2012/40215* (2013.01); *H04L 2012/40273* (2013.01)

(58) Field of Classification Search
CPC . H04L 63/1416; H04L 63/1466; H04L 63/20; H04L 12/40
See application file for complete search history.

(56) References Cited

U.S. PATENT DOCUMENTS

| | | | |
|---|---|---|---|
| 2018/0109622 A1* | 4/2018 | Galula | ................ H04W 84/005 |
| 2020/0412756 A1* | 12/2020 | Kishikawa | .............. H04W 4/48 |
| 2023/0231864 A1* | 7/2023 | Yasmin | ............... H04L 63/1441 726/22 |

* cited by examiner

*Primary Examiner* — Jeffrey C Pwu
*Assistant Examiner* — Thong P Truong
(74) *Attorney, Agent, or Firm* — Slater Matsil, LLP (57) ABSTRACT

A security system for an in-vehicle network includes a gateway including at least one processor, wherein the at least one processor is configured to transition an intrusion detection and prevention system (IDPS) loaded into the gateway from a function off mode to a first monitoring mode and detect an intrusion into a general message and a diagnostic message on the in-vehicle network, transition from the first monitoring mode to a second monitoring mode and stop detecting the intrusion into the general message when there is a request to stop transmitting the general message from outside, detect the intrusion into the diagnostic message, and detect and block the general message introduced into the in-vehicle network.

20 Claims, 6 Drawing Sheets

SECURITY SYSTEM FOR IN-VEHICLE NETWORK AND METHOD THEREFOR

CROSS-REFERENCE TO RELATED APPLICATIONS

This application claims the benefit of Korean Patent Application No. 10-2020-0170854, filed in the Korean Intellectual Property Office on Dec. 8, 2020, which application is hereby incorporated herein by reference.

TECHNICAL FIELD

The present disclosure relates to a security system for an in-vehicle network (P/N) and a method therefor.

BACKGROUND

With the increase of electronic systems in the vehicle, there has been a growing trend to threaten security. A vehicle controller may be randomly manipulated or any signal may be transmitted over an in-vehicle network (P/N), thus providing vehicles and drivers with a lethal threat. Thus, studies are in progress for applying an intrusion detection and prevention system (IDPS), which is an information technology (IT) security technology, to gateways in the vehicles. The IDPS may verify all packets introduced into the IVN and may block packets, the hacking risk of which is detected, thus preventing hacking capable of being generated in the vehicle. Furthermore, the IDPS may notify a vehicle driver and/or a security operation center of the detected hacking risk, thus defending a corresponding type of hacking later.

There is a detection technique for several violations (e.g., an identification (ID) for the controller area network (CAN), a data length code (DLC), a transmission period, signal value violation, a rate of change in signal value, and the like) in the IDPS. The IDPS may detect violations for a diagnostic message based on the international organization for standardization (ISO) standard specification other than the general message. Herein, because the transmission of the general message is stopped to reduce a load of the bus in a specific situation, for example, a situation where a controller diagnostic reprogramming event occurs, an IDPS function may also be stopped because there is no message capable of being detected. Thus, because it is unable to detect or block a malicious behavior (e.g., hacking, intrusion, and/or the like) which occurs in the controller diagnostic reprogramming situation, it may be defenseless against security.

SUMMARY

Embodiments of the present disclosure can solve problems occurring in the prior art while advantages achieved by the prior art are maintained intact.

An embodiment of the present disclosure provides a security system for an in-vehicle network for detecting and blocking a malicious behavior which occurs on the in-vehicle network in a diagnostic reprogramming situation and a method therefor.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a security system for an in-vehicle network may include a gateway including at least one processor. The at least one processor may transition an intrusion detection and prevention system (IDPS) loaded into the gateway from a function off mode to a first monitoring mode and may detect an intrusion into a general message and a diagnostic message on the in-vehicle network, may transition from the first monitoring mode to a second monitoring mode and may stop detecting the intrusion into the general message, when there is a request to stop transmitting the general message from the outside, and may detect an intrusion into the diagnostic message, and may detect and block the general message introduced into the in-vehicle network.

The security system may further include a storage storing an IDPS rule.

The at least one processor may generate and store a log for the detected general message in the storage, when detecting the general message introduced into the in-vehicle network.

The at least one processor may determine whether the diagnostic message is an attack message based on the IDPS rule in the second monitoring mode.

The at least one processor may transition from the second monitoring mode to the first monitoring mode, when not receiving a session maintenance request message within a predetermined time in the second monitoring mode.

The at least one processor may transition from the second monitoring mode to the first monitoring mode, when receiving a communication control command to permit to transmit the general message from the outside in the second monitoring mode.

The in-vehicle network may be a controller area network (CAN).

The IDPS may be a software module executed by the at least one processor.

According to another embodiment of the present disclosure, a security method for an in-vehicle network may include transitioning an intrusion detection and prevention system (IDPS) loaded into a gateway from a function off mode to a first monitoring mode, when a vehicle starts, and detecting an intrusion into a general message and a diagnostic message on the in-vehicle network, transitioning from the first monitoring mode to a second monitoring mode and stopping detecting the intrusion into the general message, when there is a request to stop transmitting the general message from the outside, and detecting an intrusion into the diagnostic message, and detecting and blocking the general message introduced into the in-vehicle network.

The detecting of the intrusion into the general message and the diagnostic message may include examining the general message and the diagnostic message under an IDPS rule in the first monitoring mode to detect an attack message and blocking routing of the attack message.

The detecting of the intrusion into the diagnostic message may include transitioning from the first monitoring mode to the second monitoring mode, when receiving a communication control command to request to stop transmitting the general message in the first monitoring mode, examining the diagnostic message based on an IDPS rule to detect an attack message, and blocking routing of the detected attack message.

The detecting and blocking of the general message may include generating a log for the detected general message, when the general message introduced into the in-vehicle network is detected in the second monitoring mode.

The security method may further include transitioning from the second monitoring mode to the first monitoring mode, when not receiving a session maintenance request message within a predetermined time in the second monitoring mode.

The security method may further include transitioning from the second monitoring mode to the first monitoring mode, when receiving a communication control command to permit to transmit the general message in the second monitoring mode.

The in-vehicle network may be a controller area network (CAN).

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure may provide an intrusion detection and prevention system (IDPS) operation method capable of detecting and blocking a malicious behavior (an attack) generated in an in-vehicle network (IVN) using an IDPS without turning off the IDPS, when the transmission (transmission and reception) of a general message is stopped to reduce a load rate of a bus in a diagnostic reprogramming environment. Herein, a communication technology, such as a controller area network (CAN), a media oriented systems transport (MOST) network, a local interconnect network (LIN), an Ethernet, and/or an X-by-Wire (Flexray), is applicable to the IVN.

Figure 1:
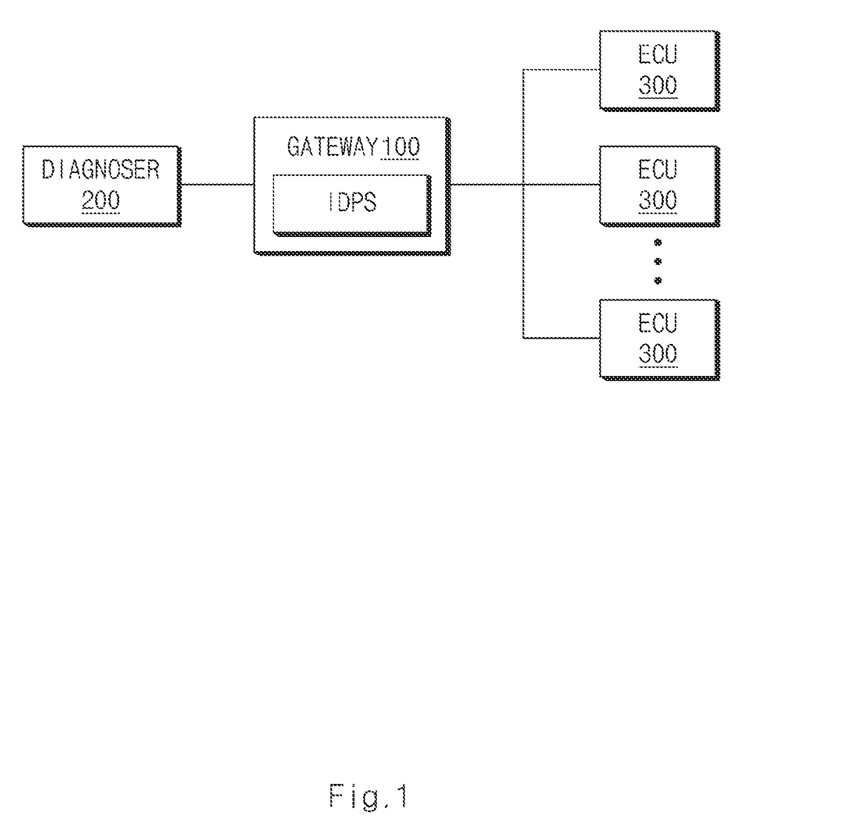
FIG. 1 is a block diagram illustrating a configuration of a security system according to embodiments of the present disclosure.
Figure 2:
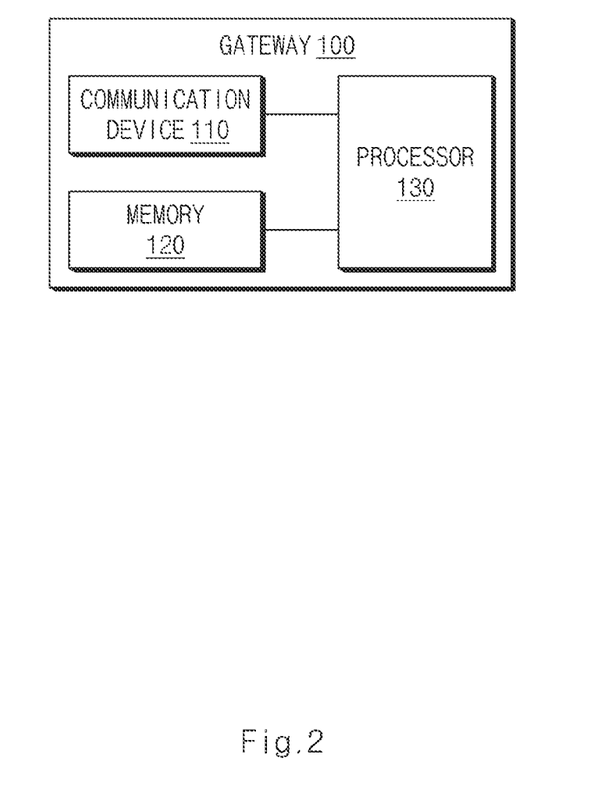
FIG. 2 is a block diagram illustrating a configuration of a gateway according to embodiments of the present disclosure.

FIG. 1 is a block diagram illustrating a configuration of a security system according to embodiments of the present disclosure. FIG. 2 is a block diagram illustrating a configuration of a gateway according to embodiments of the present disclosure.

Referring to FIG. 1, the security system may be for an in-vehicle network (IVN), which may include a gateway 100, a diagnoser 200, a plurality of electronic control units (ECUs) 300, and the like.

The gateway 100 may support interconnection between the IVN and an external network. The gateway 100 may be a central gateway (CGW) located on a boundary of the IVN. The gateway 100 may play a role as a router which delivers data between domains (e.g., a power train, a chassis, a body, and/or multimedia) in the vehicle.

The gateway 100 may include an IDPS. The IDPS may detect a malicious behavior generated in the IVN and may generate a log for the detected malicious behavior. The IDPS may block the detected malicious behavior. The IDPS may be a software module, which may be stored in a storage medium and may be executed by a processor 130 described below.

The gateway 100 may inspect all network traffic (e.g., packets, data, and/or messages) introduced into the IVN through an on-board diagnostic (OBD) port using the IDPS to detect malicious traffic. When the malicious traffic is detected, the gateway 100 may generate information about the traffic as a log. Furthermore, the gateway 100 may block routing of the malicious traffic.

A diagnoser 200 may be located outside the vehicle and may be implemented as a hardware diagnostic device and/or a software diagnostic tool. The diagnoser 200 may transmit a command to the vehicle depending on a reprogramming sequence. The diagnoser 200 may transmit a command (a diagnostic message) based on unified diagnostic services (UDS). The UDS may be a diagnostic communication protocol used in the ECU 300 in the vehicle, which is defined in ISO 14229-1.

The ECU 300 may be an electronic device which is loaded into the vehicle to control an internal sub-system. The ECU 300 may collect data using various sensors mounted on the vehicle and may analyze the collected data to output a control signal. The ECU 300 may be a controller such as an airbag control unit (ACU), an engine control unit, a brake control unit (BCU), an on board diagnostics (OBD), a transmission control unit (TCU), an electronic stability control (ESC), a traction control system (TCS), and/or an antilock brake system (ABS). The ECUs 300 may be connected with each other over the IVN to transmit and receive data with each other.

Referring to FIG. 2, the gateway 100 may include a communication device 110, a memory (i.e., a storage) 120, a processor 130, and the like.

The communication device 110 may support wired communication or wireless communication between the gateway 100 and an external electronic device (e.g., the diagnoser 200, a terminal, a security center server, or the like). The communication device 110 may support data communication between the ECUs 300 connected over the IVN. The communication device 110 may include a communication processor, a communication circuit, an antenna, a transceiver, and/or the like.

The memory 120 may store the IDPS, an IDPS rule, detected intrusion information (log), log information about a message transmitted and received over the IVN, and/or the like. The memory 120 may store detection techniques for detecting a malicious behavior which threatens the security of the IVN. Furthermore, the memory 120 may store predetermined rules (IDPS rules) for detecting a malicious behavior.

The memory 120 may be a non-transitory storage medium which stores instructions executed by the processor 130. The memory 120 may store a variety of information which is previously set. The memory 120 may be implemented as at least one of storage media (recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), a register, and/or a web storage.

The processor 130 may be electrically connected with the communication device 110, the memory 120, and the like to control operations of the respective components. The processor 130 may perform the overall control of the gateway 100. The processor 130 may be implemented as at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor.

When an ignition switch of the vehicle is turned on, the processor 130 may prepare for routing. In other words, when the vehicle starts, the processor 130 may perform a preparation process of the gateway 100. When the routing preparation of the gateway 100 is completed, the processor 130 may execute the IDPS. The IDPS may operate in three operation modes. The operation modes may be divided into a function off mode, a normal monitoring mode (a first monitoring mode), and a disable normal message transmission (DNMT) monitoring mode (a second monitoring mode).

When the operation mode of the IDPS transitions from the function off mode to the normal monitoring mode, the processor 130 may detect an attack message on the IVN using a default detection technique. The processor 130 may examine a message (a general message and a diagnostic message) introduced into the IVN based on the IDPS rule to determine a malicious message. For example, the processor 130 may compare a message ID (a CAN ID), a data length code (DLC), a transmission period, a signal value, a range of change in signal value, a diagnostic message acknowledgement, and/or the like with values specified in the memory 120 to determine whether a message on the IVN is a message (an attack message) which threatens security. The processor 130 may block routing of the detected malicious message.

When receiving an IDPS stop request from the diagnoser 200 or a security operation center in the normal monitoring mode and the DNMT monitoring mode, the processor 130 may transition the operation mode of the IDPS to the function off mode.

Furthermore, when transmitting a communication control command (a general message transmission stop command) to request all the ECUs 300 in the vehicle to stop transmitting the general message to operate a reprogramming sequence or evaluate a controller in the normal monitoring mode, the processor 130 may transition the operation mode of the IDPS from the normal monitoring mode to the DNMT monitoring mode.

A communication control message (the communication control command) requesting to stop transmitting the general message may consist of three data bytes like Table 1 below. A service identifier (SID) may be included in a first data byte (#1d), and diagnostic parameters may be included in a second data byte (#2d) and a third data byte (#3d).

TABLE 1

| Data Byte | Parameter Name | Cvt | Hex Value |
|---|---|---|---|
| #1d | Communication Control Request Service ID | M | #28h |
| #2d | Sub-function = [disableRxAndTx]X: This value indicates that the reception and transmission of messages shall be disabled for the specified communicationType | M | #03h |
| #3d | communicationType-X: networkManagementCommunicationMessages and normalCommunicationMessages | M | #03h |

When the operation mode of the IDPS transitions to the DNMT monitoring mode, the processor 130 may stop detecting an intrusion into all general messages and may determine whether there is a general message introduced into the IVN. When the general message is introduced into the IVN, the processor 130 may detect the general message to generate a log and may block routing of the general message. The processor 130 may examine a diagnostic message based on the IDPS rule to detect an intrusion to be the same as that in the normal monitoring mode. The processor 130 may detect an intrusion into a diagnostic message transmitted and received for reprogramming.

The processor 130 may determine whether the diagnostic message requesting to maintain a diagnostic session is periodically received in the DNMT monitoring mode. Herein, the diagnostic message may be a session maintenance request message transmitted to a specified functional address (e.g., 0x7DF) for all the ECUs 300 in the vehicle, which may be a 3E (Tester Present) diagnostic message. In other words, the processor 130 may determine whether the session maintenance request message is received within a predetermined time (e.g., 5 seconds). When the session maintenance request message is not received within the predetermined time, the processor 130 may switch the operation mode of the IDPS from the DNMT monitoring mode to the normal monitoring mode.

Figure 3:
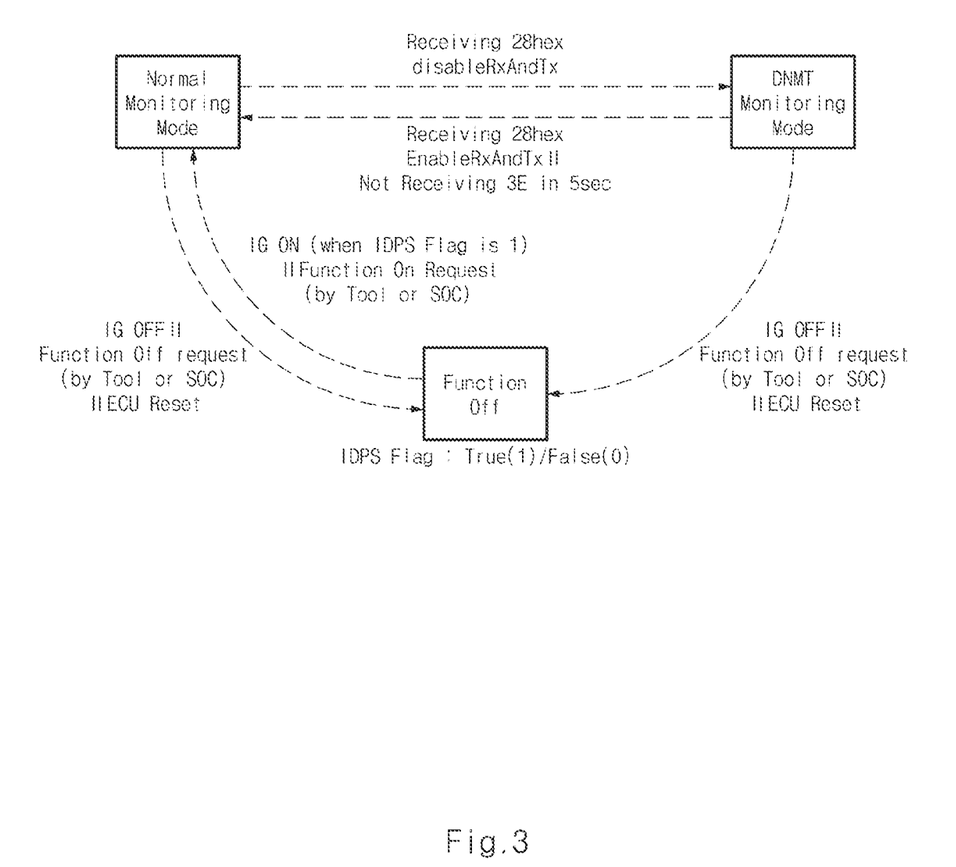
FIG. 3 is a drawing illustrating an IDPS state transition diagram according to embodiments of the present disclosure.

FIG. 3 is a drawing illustrating an IDPS state transition diagram according to embodiments of the present disclosure.

Referring to FIG. 3, a gateway 100 of FIG. 2 may maintain an IDPS function off mode in a state where the vehicle is turned off and may transition from an IDPS function off mode to a normal monitoring mode to detect a network packet (network traffic) depending on an IDPS rule, when the vehicle is turned on. When the IDPS flag is set to 'True (1)' when the vehicle starts, the gateway 100 may automatically transition from the IDPS function off mode to the normal monitoring mode. When the IDPS flag is set to 'False (0)' when the vehicle starts, the gateway 100 may maintain the IDPS function off mode. When the IDPS function is turned off by an external tool or a security operation center (SOC), the IDPS flag may be set to 'False (0)'. When an IDPS function on command is received by the external tool or the SOC, the gateway 100 may change and set the IDPS flag from '0' to '1'.

The gateway 100 may perform intrusion detection and prevention based on an existing IDPS rule, for example, a rule for a CAN ID, a DLC, a transmission period, a signal value violation, a rate of change in signal value, and/or a diagnostic message in the normal monitoring mode. When receiving communication control (disableRxAndTx) in the normal monitoring mode, the gateway 100 may transition from the normal monitoring mode to a DNMT monitoring mode to operate under a rule corresponding to the DNMT monitoring mode. When receiving the communication control (enableRxAndTx) in the DNMT monitoring mode or not receiving a session maintenance request (Tester Present) message within a predetermined time (e.g., 5 seconds), the gateway 100 may determine that a corresponding session is disconnected to transition to the normal monitoring mode. When the Tester Present message is not received within the predetermined time according to ISO 14229-1, a diagnostic session may transition to a default session and the general message transmission stop may be released.

When the vehicle is turned off in the DNMT monitoring mode to be the same as that in the normal monitoring mode or when the IDPS function off command is received by the SOC or the external tool, the gateway 100 may transition from the DNMT monitoring mode to the function off mode to fail to perform an intrusion detection and prevention function. When the IDPS function is turned off by the SOC or the external tool, the IDPS flag value may be set to 'False (0)'.

When receiving an ECU reset command, as the ECU 300 is initiated, the gateway 100 may temporarily transition to the function off mode and may then transition to the normal monitoring mode.

Figure 4:
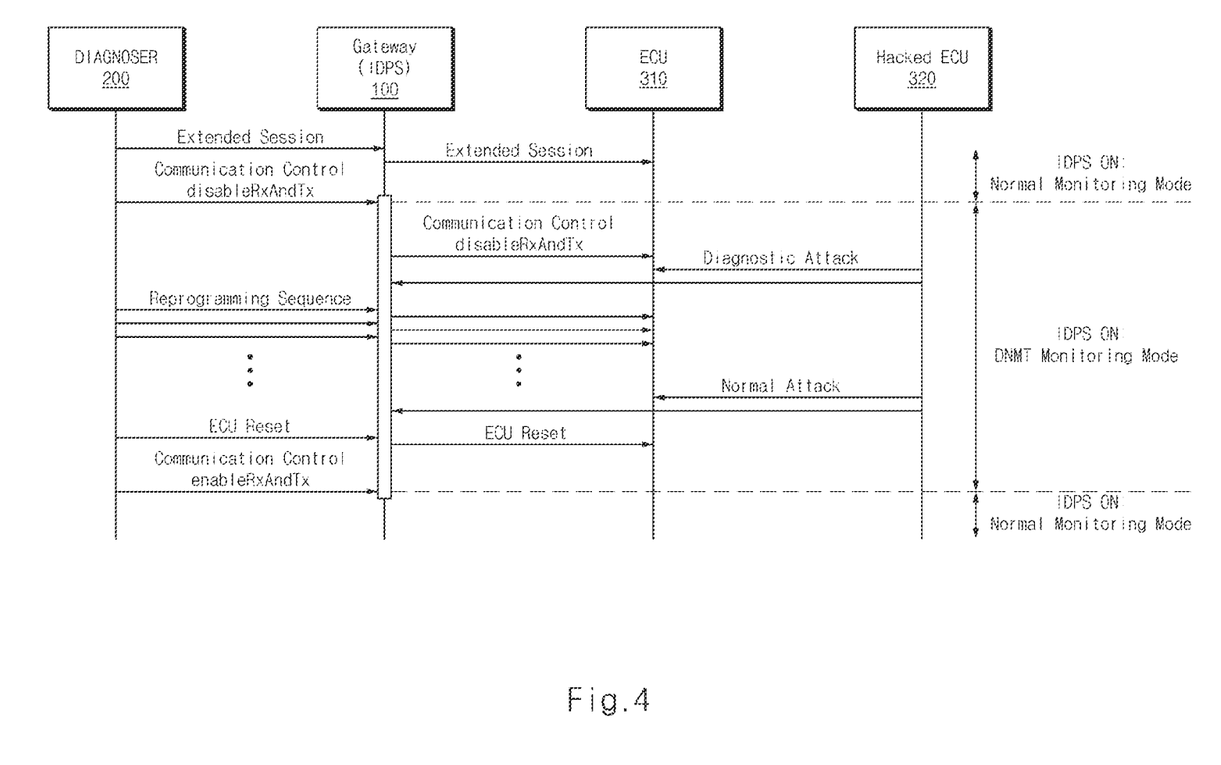
FIG. 4 is a signal sequence diagram illustrating an IDPS procedure according to embodiments of the present disclosure.

FIG. 4 is a signal sequence diagram illustrating an IDPS procedure according to embodiments of the present disclosure.

The present embodiment is exemplified as a hacked ECU 320 attacks the IVN in a process where a diagnoser 200 reprograms an ECU 310.

Referring to FIG. 4, the diagnoser 200 may transmit a message requesting to connect to a diagnostic session (an extended session) to a gateway 100. The gateway 100 may request the ECU 310 to connect to the diagnostic session (the extended session) depending on the request of the diagnoser 200. When there is the request to connect to the diagnostic session (the extended session), the gateway 100 may enable an IDPS function and may transition from a function off mode to a normal monitoring mode. Thereafter, the gateway 100 may examine a general message and a diagnostic message on the IVN under an IDPS rule to detect and block a malicious message.

When receiving a command to stop transmitting the general message, for example, a communication control (disableRxAndTx) command from the diagnoser 200 in the normal monitoring mode, the gateway 100 may transition from the normal monitoring mode to a DNMT monitoring mode. The gateway 100 may examine the diagnostic message under a diagnostic message rule to detect a malicious message.

The diagnoser 200 may transmit a command to a vehicle depending on a reprogramming sequence, while the gateway 100 operates in the DNMT monitoring mode. At this time, when the hacked ECU 320 makes an attack (a diagnostic attack) on the IVN using the diagnostic message, the gateway 100 may examine the diagnostic message based on the diagnostic message rule to detect and block the diagnostic message as an attack message. When the hacked ECU 320 makes an attack (a normal attack) on the IVN using the general message, the gateway 100 may unconditionally block the general message, irrespective of a CAN ID, a DLC, a transmission period, a signal value violation, a rate of change in signal value, and/or the like. In other words, the gateway 100 may detect a general message introduced into the IVN and may generate (record) and block a log for the general message. The generated log may be transmitted to a driver or a security operation center to be processed.

When the reprogramming of the ECU 310 is completed, the diagnoser 200 may transmit an ECU reset command to the ECU 310. Thereafter, the diagnoser 200 may transmit a communication control command, for example, a communication control (enableRxAndTx) command, permitting to transmit the general message. When receiving a command to permit transmission of the general message transmitted from the diagnoser 200, the gateway 100 may transition from the DNMT monitoring mode to the normal monitoring mode and may perform an intrusion detection and prevention function based on a default IDPS rule.

Figure 5:
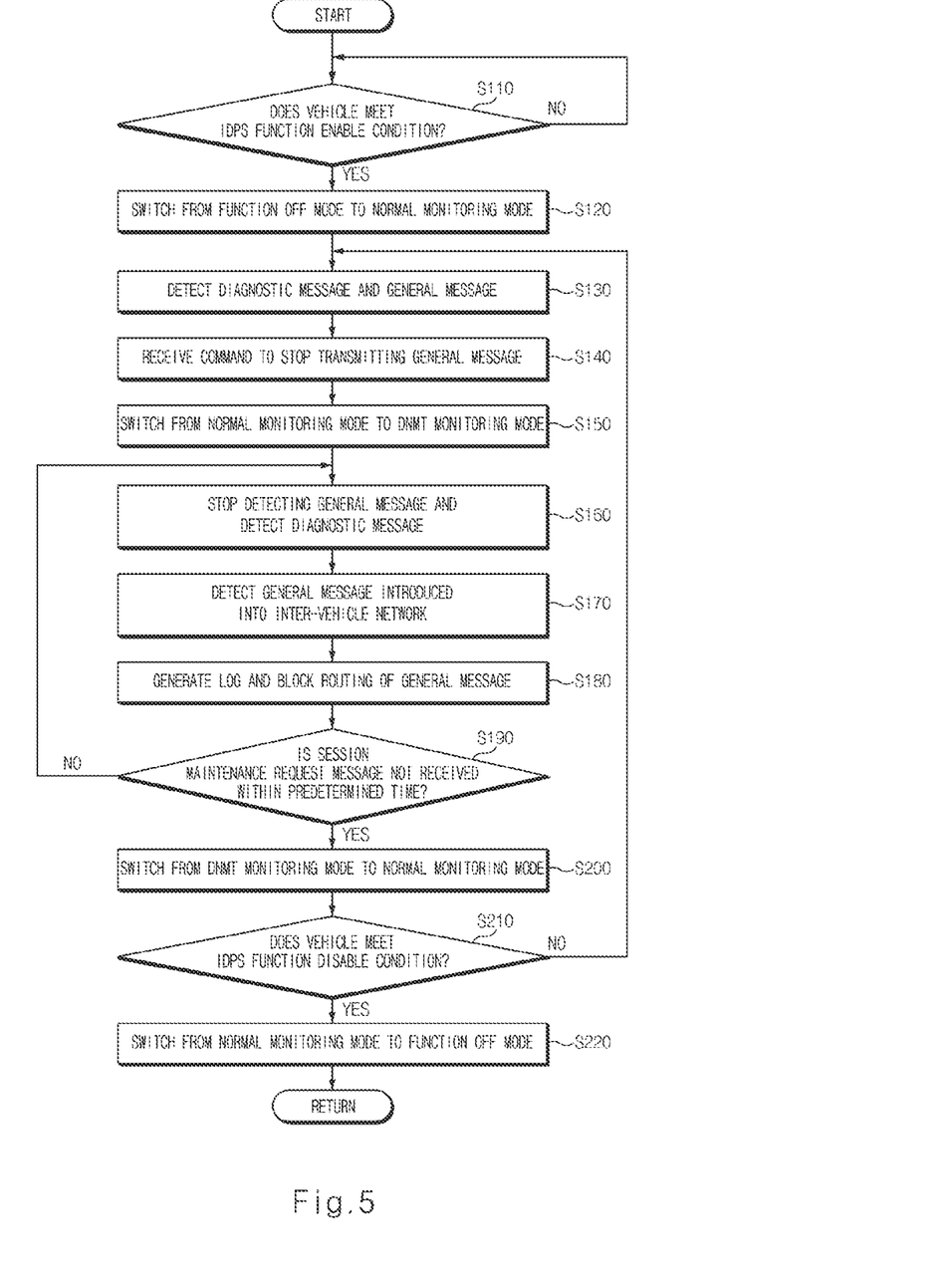
FIG. 5 is a flowchart illustrating a security method for an in-vehicle network according to embodiments of the present disclosure.

FIG. 5 is a flowchart illustrating a security method for an in-vehicle network according to embodiments of the present disclosure.

Referring to FIG. 5, in S110, a gateway 100 of FIG. 1 may determine whether the vehicle meets an IDPS function enable condition.

When the vehicle meets the IDPS function enable condition, in S120, the gateway 100 may switch an IDPS from a function off mode to a normal monitoring mode. When the vehicle is turned on, the gateway 100 may execute the IDPS to enter the normal monitoring mode. The gateway 100 may connect a diagnostic session depending on the request of a diagnoser 200 of FIG. 1.

When switching to the normal monitoring mode, in S130, the gateway 100 may detect a general message and a diagnostic message. The gateway 100 may examine the general message and the diagnostic message based on an IDPS rule to detect a malicious message.

In S140, the gateway 100 may receive a command to stop transmitting the general message in the normal monitoring mode. It may be requested to stop transmitting and receiving the general message to reprogram an ECU 300 in the vehicle or evaluate the ECU 300. For example, the diagnoser 200 may transmit a communication control message requesting to stop transmitting the general message to the gateway 100.

When the command to stop transmitting the general message is received, in S150, the gateway 100 may switch the normal monitoring mode to a DNMT monitoring mode.

When switching to the DNMT monitoring mode, in S160, the gateway 100 may stop detecting the general message and may detect an intrusion into the diagnostic message. The gateway 100 may examine the diagnostic message under a rule for the diagnostic message to detect a malicious message.

In S170, the gateway 100 may detect a general message introduced into the IVN. The gateway 100 may determine whether the general message is only introduced into the IVN without detecting the general message based on the IDPS rule.

When the general message introduced into the IVN is detected, in S180, the gateway 100 may generate a log for the detected general message and may block routing of the general message.

In S190, the gateway 100 may determine whether a session maintenance request message is received within a predetermined time. The gateway 100 may determine whether a 3E (Tester Present) diagnostic message transmitted to all of the ECUs 300 in the vehicle is received.

When the session maintenance request message is not received, in S200, the gateway 100 may switch from the DNMT monitoring mode to the normal monitoring mode.

In S210, the gateway 100 may determine whether the vehicle meets an IDPS function disable condition. The gateway 100 may determine whether an IDPS function off command is received from the diagnoser 200 or a security center server or whether the vehicle is turned off.

When the vehicle meets the IDPS function disable condition, in S220, the gateway 100 may switch from the normal monitoring mode to the function off mode.

When the session maintenance request message is received in S190, the gateway 100 may perform the operation from S160. When the vehicle does not meet the IDPS function disable condition in S210, the gateway 100 may return to S130.

Figure 6:
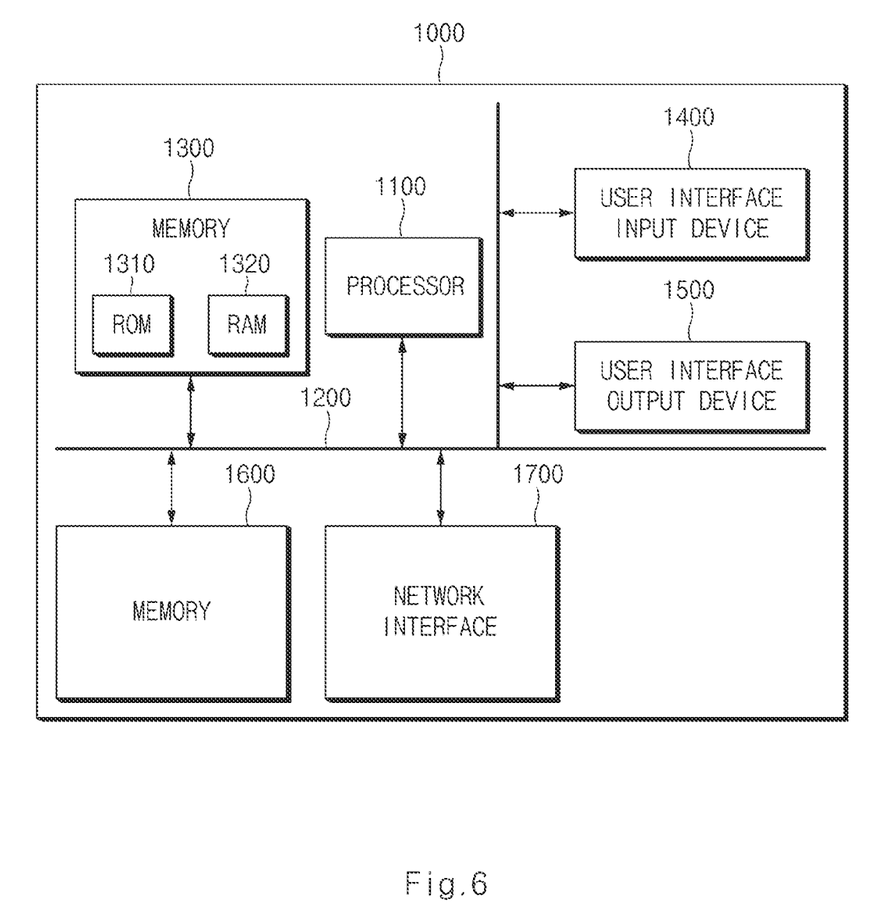
FIG. 6 is a block diagram illustrating a computing system for executing a security method according to embodiments of the present disclosure.

FIG. 6 is a block diagram illustrating a computing system for executing a security method according to embodiments of the present disclosure.

Referring to FIG. 6, a computing system 1000 may include at least one processor 1100, a memory 1300, a user interface input device 1400, a user interface output device 1500, a memory, i.e., a storage, 1600, and a network interface 1700, which are connected with each other via a bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the security system may detect, record, and/or block a general message introduced into the in-vehicle network in the diagnostic reprogramming situation, thus strengthening security.

Furthermore, according to embodiments of the present disclosure, the security system may detect and block a diagnostic message, because of turning off an IDPS function although the transmission of the general message is stopped in the diagnostic reprogramming situation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A security system for an in-vehicle network, the security system comprising:
a gateway including at least one processor, wherein the at least one processor is configured to:
transition an intrusion detection and prevention system (IDPS) loaded into the gateway from a function off mode to a first monitoring mode and detect an intrusion into a general message and a diagnostic message on the in-vehicle network;
transition from the first monitoring mode to a second monitoring mode and stop detecting the intrusion into the general message when there is a request to stop transmitting the general message from outside, and detect the intrusion into the diagnostic message; and
detect and block the general message introduced into the in-vehicle network;
wherein the at least one processor is configured to transition from the second monitoring mode to the first monitoring mode:
when a session maintenance request message is not received within a predetermined time in the second monitoring mode; or
when a communication control command to permit transmission of the general message from the outside in the second monitoring mode is received.

2. The security system of claim 1, further comprising a memory configured to store an IDPS rule.

3. The security system of claim 2, wherein the at least one processor is configured to generate and store a log for the detected general message in the memory when detecting the general message introduced into the in-vehicle network.

4. The security system of claim 3, wherein the in-vehicle network is a controller area network.

5. The security system of claim 2, wherein the at least one processor is configured to determine whether the diagnostic message is an attack message based on the IDPS rule in the second monitoring mode.

6. The security system of claim 5, wherein the in-vehicle network is a controller area network.

7. The security system of claim 2, wherein the in-vehicle network is a controller area network.

8. The security system of claim 1, wherein the in-vehicle network is a controller area network.

9. The security system of claim 1, wherein the IDPS is a software module configured to be executed by the at least one processor.

10. A security method for an in-vehicle network, the security method comprising:
transitioning an intrusion detection and prevention system (IDPS) loaded into a gateway from a function off mode to a first monitoring mode when a vehicle starts and detecting an intrusion into a general message and a diagnostic message on the in-vehicle network;
transitioning from the first monitoring mode to a second monitoring mode and stopping detecting the intrusion into the general message upon receipt of a request to stop transmitting the general message from the outside and detecting the intrusion into the diagnostic message; and detecting and blocking the general message introduced into the in-vehicle network;

wherein the security method further comprises transitioning from the second monitoring mode to the first monitoring mode after not receiving a session maintenance request message within a predetermined time in the second monitoring mode or upon receipt of a communication control command to permit transmission of the general message in the second monitoring mode.

11. The security method of claim 10, wherein detecting the intrusion into the general message and the diagnostic message includes:

examining the general message and the diagnostic message under an IDPS rule in the first monitoring mode to detect an attack message; and blocking routing of the attack message.

12. The security method of claim 10, wherein detecting the intrusion into the diagnostic message includes:

transitioning from the first monitoring mode to the second monitoring mode upon receipt of the communication control command requesting to stop transmitting the general message in the first monitoring mode;

examining the diagnostic message based on an IDPS rule to detect an attack message; and blocking routing of the detected attack message.

13. The security method of claim 10, wherein detecting and blocking of the general message includes generating a log for the detected general message upon detecting the general message being introduced into the in-vehicle network in the second monitoring mode.

14. The security method of claim 10, wherein the in-vehicle network is a controller area network.

15. A security system for an in-vehicle network, the security system comprising:

a diagnoser;

a gateway communicably coupled to the diagnoser and including at least one processor, wherein the at least one processor is configured to:

transition an intrusion detection and prevention system (IDPS) loaded into the gateway from a function off mode to a first monitoring mode and detect an intrusion into a general message and a diagnostic message on the in-vehicle network;

transition from the first monitoring mode to a second monitoring mode and stop detecting the intrusion into the general message when there is a request to stop transmitting the general message from outside, and detect the intrusion into the diagnostic message; and detect and block the general message introduced into the in-vehicle network; and at least one electronic control unit communicably coupled to the gateway;

wherein the at least one processor is configured to transition from the second monitoring mode to the first monitoring mode when a session maintenance request message is not received within a predetermined time in the second monitoring mode; or wherein the at least one processor is configured to transition from the second monitoring mode to the first monitoring mode when a communication control command to permit transmission of the general message from the outside in the second monitoring mode is received.

16. The security system of claim 15, wherein the gateway further comprises a memory configured to store an IDPS rule.

17. The security system of claim 16, wherein the at least one processor is configured to generate and store a log for the detected general message in the memory when detecting the general message introduced into the in-vehicle network.

18. The security system of claim 16, wherein the at least one processor is configured to determine whether the diagnostic message is an attack message based on the IDPS rule in the second monitoring mode.

19. The security system of claim 15, wherein the in-vehicle network is a controller area network.

20. The security system of claim 15, wherein the IDPS is a software module configured to be executed by the at least one processor.

* * * * *